US010354236B1

United States Patent
Wang

(10) Patent No.: US 10,354,236 B1
(45) Date of Patent: Jul. 16, 2019

(54) METHODS FOR PREVENTING FRONT RUNNING IN DIGITAL ASSET TRANSACTIONS

(71) Applicant: Loopring Project Ltd, Road Town Tortola (VG)

(72) Inventor: Dong Wang, Fremont, CA (US)

(*) Notice: Subject to any disclaimer, the term of this patent is extended or adjusted under 35 U.S.C. 154(b) by 0 days.

(21) Appl. No.: 16/024,904

(22) Filed: Jul. 1, 2018

Related U.S. Application Data

(60) Provisional application No. 62/629,056, filed on Feb. 11, 2018, provisional application No. 62/629,058, filed on Feb. 11, 2018.

(51) Int. Cl.
| | |
|---|---|
| *G06Q 20/06* | (2012.01) |
| *G06Q 20/38* | (2012.01) |
| *H04L 9/32* | (2006.01) |
| *H04L 9/06* | (2006.01) |

(52) U.S. Cl.
CPC ..... *G06Q 20/0658* (2013.01); *G06Q 20/3823* (2013.01); *G06Q 20/3825* (2013.01); *G06Q 20/3829* (2013.01); *H04L 9/3255* (2013.01); *G06Q 2220/00* (2013.01); *H04L 9/0643* (2013.01); *H04L 2209/38* (2013.01)

(58) Field of Classification Search
CPC ....... G06Q 20/3829; G06Q 10/063114; G06Q 20/405; G06Q 50/18; G06Q 2230/00; G06Q 30/0214; G06Q 40/08; G06Q 20/10; G06Q 20/38; G06Q 20/38215
See application file for complete search history.

(56) References Cited

U.S. PATENT DOCUMENTS

| | | | | |
|---|---|---|---|---|
| 5,781,912 A | * | 7/1998 | Demers | G06F 11/1474 707/634 |
| 2014/0279534 A1 | * | 9/2014 | Miles | G06Q 20/42 705/44 |
| 2017/0048216 A1 | * | 2/2017 | Chow | G06Q 20/0655 |
| 2017/0116693 A1 | * | 4/2017 | Rae | G06F 21/64 |
| 2017/0178128 A1 | * | 6/2017 | Fourez | G06Q 20/38 |
| 2018/0032383 A1 | * | 2/2018 | Surcouf | G06F 9/546 |
| 2018/0167394 A1 | * | 6/2018 | High | G05B 19/00 |
| 2018/0183606 A1 | * | 6/2018 | High | G06F 17/30371 |

OTHER PUBLICATIONS

Gvain Wood. Ethereum: a secure decentralised generalised transaction ledger. Ethereum Project Yellow Paper 2014.
Patrick Dai et al. Smart-contract value-transfer protocols on a distributed mobile application platform. 2017.
Viktor Atterlonn. A distributed ledger for gamification of po-bono time, 2018.
Satoshi Nakamoto et al. Bitcoin: a peer-to-peer electronic cash system. 2008.
Fabian Schuh and Daniel Larimer. Bitshares 2.0: Financial smart contract platform, 2015.

(Continued)

*Primary Examiner* — Johann Y Choo
(74) *Attorney, Agent, or Firm* — Yi Zhang

(57) ABSTRACT

Provided is a method for matching orders of digital assets. The method comprises: receiving a plurality orders of digital asset from a plurality addresses on a distributed ledger, wherein each of the orders comprises a digital signature of the address, an authorizing public key, and an authorizing private key.

20 Claims, 7 Drawing Sheets

(56) References Cited

OTHER PUBLICATIONS

Eyal Hertzog et al. Bancor Protocol: continuous liquidity for cryptographic tokens through their smart contracts Mar. 18, 2018.
Will Warren and Amir Bandeali, 0x: An open protocol for decentralized exchange on the ethereum blockchain, 2017.
Daniel Wang. Dual authoring looprings solution to front-running. Feb. 11, 2018.
Daniel Wang et al. Loopring: a decentralized token exchange protocol. v 1.5 Dec. 29, 2017.

* cited by examiner

US 10,354,236 B1

METHODS FOR PREVENTING FRONT RUNNING IN DIGITAL ASSET TRANSACTIONS

CROSS-REFERENCE TO RELATED APPLICATIONS

This application claims priority to U.S. provisional patent application nos. 62/629,056, filed Feb. 11, 2018, and 62/629,058, filed Feb. 11, 2018, the disclosure of which is incorporated herein by reference.

FIELD OF THE INVENTION

The present invention generally relates to digital assets transaction.

BACKGROUND

With the proliferation of blockchain-based assets, the need to exchange these assets amongst counterparties has significantly increased. As thousands of new tokens are introduced, including the tokenization of traditional assets, this need is magnified. Whether exchanging tokens for speculative trading motivations or converting to access networks via their native utility tokens, the ability to exchange one cryptoasset for another is foundational for the larger ecosystem. Indeed, there is a potential energy in assets, and realizing this energy, i.e., unlocking capital, requires not only asserting ownership, which blockchains have immutably allowed for, but the ability to freely transfer and transform these assets.

As such, the trustless exchange of tokens (value) is a compelling use case for blockchain technology. Until now, however, crypto enthusiasts have largely settled for trading tokens on traditional centralized exchanges. A new method and system for digital asset transaction is needed because, just as Bitcoin dutifully emphasized, in regards to peer-to-peer electronic cash, the main benefits are lost if a trusted third party is still required to prevent double-spending, so too are the main benefits of decentralized assets lost if they must pass through trusted, gated, centralized exchanges.

Trading decentralized tokens on centralized exchanges doesn't make sense from a philosophical perspective, as it fails to uphold the virtues these decentralized projects espouse. There are also numerous practical risks and limitations in using centralized exchanges which are described below. Decentralized exchanges (DEXs) have sought to address these issues, and in many cases have succeeded in alleviating security risks by using blockchains for disintermediation. However, as DEX capability becomes crucial infrastructure for the new economy, there is substantial room for performance improvement.

There are three primary risks in centralized exchanges: 1) lack of security; 2) lack of transparency; and 3) lack of liquidity.

Lack of security arises from users typically surrendering control of their private-keys (funds) to one centralized entity. This exposes users to the possibility that centralized exchanges fall prey to malicious hackers. The security and hacking risks facing all centralized exchanges are well known, yet are often accepted as "table stakes" for token trading. Centralized exchanges continue to be honeypots for hackers to attack as their servers have custody over millions of dollars of user funds. Exchange developers can also make honest, accidental errors with user funds. Simply, users are not in control of their own tokens when deposited at a centralized exchange.

Lack of transparency exposes users to the risk of dishonest exchanges acting unfairly. The distinction here is by the exchange operator's malicious intentions, as users are not truly trading their own assets on centralized exchanges, but rather, an IOU. When tokens are sent to the exchange's wallet, the exchange takes custody, and offers an IOU in its place. All trades are then effectively between users' IOUs. To withdraw, users redeem their IOU with the exchange, and receive their tokens to their external wallet address. Throughout this process there is a lack of transparency, and the exchange can shutdown, freeze your account, go bankrupt, etc. It is also possible that they use user assets for other purposes while in custody, such as lending them out to third parties. Lack of transparency can cost users without a total loss of funds, such as in higher trading fees, delays at peak demand, regulatory risk, and orders being front ran.

Lack of liquidity is another inadequacy of centralized exchange. From the point of view of exchange operators, fragmented liquidity inhibits entry by new exchanges because of two winner-takes-all scenarios. First, the exchange with the greatest number of trading pairs wins, because users find it desirable to conduct all their trades on one exchange. Second, the exchange with the largest order book wins, because of favorable bid-ask spreads for each trading pair. This discourages competition from newcomers because it is difficult for them to build up initial liquidity. As a result, many exchanges command a high market share despite user complaints and even major hacking incidents. It's worth noting that as centralized exchanges win market share, they become an ever-larger hacking target.

From the point of view of users, fragmented liquidity significantly reduces user experience. In a centralized exchange, users are only able to trade within the exchange's own liquidity pools, against its own order book, and between its supported token pairs. To trade token A for token B, users must go to an exchange that supports both tokens or register at different exchanges, disclosing personal information. Users often need to execute preliminary or intermediate trades, typically against BTC or ETH, paying bid-ask spreads in the process. Finally, the order books may not be deep enough to complete the trade without material slippage. Even if the exchange purports to process large volumes, there is no guarantee that this volume and liquidity is not fake. The result is disconnected silos of liquidity and a fragmented ecosystem that resembles the legacy financial system, with significant trading volume centralized on few exchanges. The global liquidity promises of blockchains hold no merit within centralized exchanges.

On the other hand, current decentralized exchanges have their own inadequacies. Decentralized exchanges differ from centralized exchanges in part because users maintain control of their private-keys (assets) by performing trades directly on the underlying blockchain. By leveraging the trustless technology of cryptocurrencies themselves, they successfully mitigate many of the abovementioned risks surrounding security. However, problems persist in regards to performance and structural limitations. Liquidity often remains an issue as users must search for counterparties across disparate liquidity pools and standards. Fragmented liquidity effects are present if DEXs or dApps at large don't employ consistent standards to interoperate, and if orders are not shared/propagated across a wide network. The liquidity of limit order books, and, specifically, their resiliency, i.e., how fast filled limit orders are regenerated, can significantly affect optimal trading strategies. The absence of such standards has resulted not only in reduced liquidity, but also exposure to an array of potentially insecure proprietary smart contracts.

Furthermore, since trades are performed on chain, DEXs inherit the limitations of the underlying blockchain, namely: scalability, delays in execution (mining), and costly modifications to orders. Thus, blockchain order books do not scale particularly well, as executing code on the blockchain incurs a cost (gas), making multiple order-cancellation cadences prohibitively expensive.

Finally, because blockchain order books are public, the transaction to place an order is visible by miners as it awaits being mined into the next block and placed into an order book. This delay exposes the user to the risk of being front run and having the price or execution move against him. Front running is the illegal practice of a stockbroker executing orders on a security for its own account while taking advantage of advance knowledge of pending orders from its customers. In decentralized exchanges, front-running means someone tries to mine transactions before mining other transactions that are already in the pending transaction pool (mempool). This can be achieved by specifying a higher transaction fee (gas price), and if the front-runner happen to be a miner he can order pending transactions in a way that benefits himself.

Therefore, there is an urgent need to develop a method and system to solve the aforementioned issues.

SUMMARY

The present disclosure in one aspect provides a method for matching orders of digital asset. The method prevents ring-filch and order-filch while still ensures the settlement of rings can be done in one single transaction.

In one embodiment, the method comprises: receiving n orders of digital asset from n addresses on a distributed ledger, wherein n is an integer of at least 2, and wherein the ith order (1≤i≤n) is received from the ith address and comprises a digital signature of the ith address, an ith authorizing public key, and an ith authorizing private key; determining in a server that the n orders are matched; generating n digital signature of the server using each of the n authorizing private keys; and sending a transaction to the smart contract on the distributed ledger, wherein the transaction comprises digital signatures of each of the n addresses and the n signature of the server.

In some embodiments, at least one of the digital assets is a cryptocurrency.

In some embodiments, the distributed ledger is Bitcoin, Ethereum, Bitcoin Cash, Cardano, Stellar, NEO, Qtum, EOS, IOTA, Monero or BitShares.

In some embodiments, the distributed ledger, after receiving the smart contract, determines that each of the n addresses is not overspending.

In some embodiments, the distributed ledger, after determining that each of the n addresses is not overspending, completes the transaction according to the n orders.

The present disclosure in another aspect provides a non-transitory readable storage medium including instructions, executable by a processor in a terminal, for matching orders of digital assets.

BRIEF DESCRIPTION OF DRAWINGS

The accompanying drawings, which are incorporated herein, form part of the specification. Together with this written description, the drawings further serve to explain the principles of, and to enable a person skilled in the relevant art(s), to make and use the present invention.

DESCRIPTION OF THE INVENTION

Figure 1:
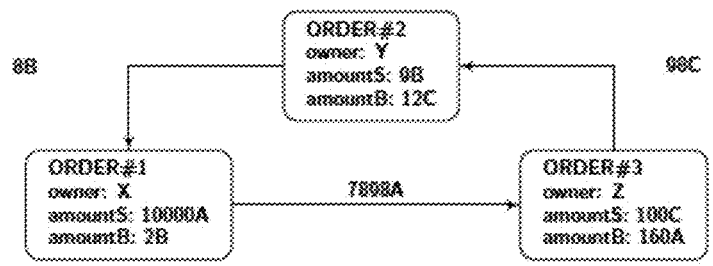
FIG. 1 illustrates an order-ring of three order under an exemplary method of the present invention.

The following description of the disclosure is merely intended to illustrate various embodiments of the disclosure. As such, the specific modifications discussed are not to be construed as limitations on the scope of the disclosure. It will be apparent to one skilled in the art that various equivalents, changes, and modifications may be made without departing from the scope of the disclosure, and it is understood that such equivalent embodiments are to be included herein. All references cited herein, including publications, patents and patent applications are incorporated herein by reference in their entirety.

Definition

The following definitions are provided to assist the reader. Unless otherwise defined, all terms of art, notations and other scientific or medical terms or terminology used herein are intended to have the meanings commonly understood by those of skill in the art. In some cases, terms with commonly understood meanings are defined herein for clarity and/or for ready reference, and the inclusion of such definitions herein should not necessarily be construed to represent a substantial difference over the definition of the term as generally understood in the art.

As used herein, the singular forms "a", "an" and "the" include plural references unless the context clearly dictates otherwise.

As used herein, an "address" or "network address" refers to an identifier for a node or hos on a telecommunications networks. Typically, addresses are designed to be unique identifiers across the network. Examples of network addresses include, without limitation, IP address, IPX address, MAC address, etc.

"Blockchain" or "block chain" refers to a continually growing list of records, i.e., blocks, that are linked and secured using cryptography. Each block typically contains a cryptographic hash of the previous block, a timestamp and transaction data. A blockchain, by design, is inherently resistant to modification of the data. Blockchain can be used as an open, distributed ledger that records transactions between two parties efficiently and in a verifiable and permanent way. When used as a distributed ledger, a blockchain is typically managed by a peer-to-peer network collectively adhering to a protocol for validating new blocks. Once recorded, the data in any given block cannot be altered retroactively without the alteration of all subsequent blocks, which requires collusion of the network majority.

The term "cryptographic hash" or "hash" refers to a mathematical algorithm that maps data of arbitrary size to a bit string of a fixed size, and is designed to be a one-way function, that is, a function which is infeasible to invert. The only way to recreate the input data from an ideal cryptographic hash function's output is to attempt a brute-force search of possible inputs to see if they produce a match, or use a rainbow table of matched hashes. Examples of cryptographic hash include SHA hash function, e.g., SHA-0, SHA-1, SHA-2 and SHA-3, and DSA function.

As used herein, a "digital signature" refers to a mathematical scheme for presenting the authenticity of digital messages or documents. A valid digital signature gives a recipient reason to believe that the message was created by a known sender, that the sender cannot deny having sent the message and that the message was not altered in transit. A typical digital signature scheme consists of three algorithms: a key generation algorithm that selects a private key uniformly at random from a set of possible private keys and outputs the private key and a corresponding public key; a signing algorithm that, given a message and a private key, produces a signature; and a signature verification algorithm that, given the message, public key and signature, either accepts or rejects the message's claim to authenticity. Examples of digital signature algorithm include, without limitation, RSA based signature schemes (e.g., RSA-PSS), DSA, Edwards-curve digital signature algorithm, Rabin signature algorithm, aggregate signature, etc.

"Distributed ledger" refers to a database that is consensually shared and synchronized across network spread across multiple sites, institutions or geographies. Distributed ledger allows transactions to have public witnesses, thereby making a cyberattack more difficult. A peer-to-peer network is usually required as well as consensus algorithm to ensure replication in nodes is undertaken. One form of distributed ledger is the blockchain system, which can be either public or private. Distributed ledger may employ a system other than blockchain to provide secure and valid achievement of distributed census.

As used herein, a "smart contact" refers to a computer protocol intended to digitally facilitate, verify or enforce the negotiation or performance of a contract. Smart contracts allow the performance of credible transactions without third parties. These transactions are trackable and irreversible. For example, smart contracts implemented on Ethereum may include those that defines the interfaces and events, that registers wallets and relays, that validates order rings, transfers tokens for settlement and emits events, that enables multi-signature ownership, and that transfers tokens on behalf of users.

Methods of Digital Asset Transaction

The present disclosure in one aspect provides methods and systems for facilitating digital asset transaction. It is understandable to those skilled in the art that such methods are implemented in a distributed network which may include one or more computer servers and devices that are connected and communicated with each other. Correspondingly, the systems disclosed herein include both hardware, such as computer servers and devices, and software. Suitable computer servers include, without limitation, a rack server, a tower server, a miniature server, a blade server, a mini rack server, a mobile server, an ultra-dense server, a super server, and may include various hardware components, for example, a mother board, a processing unit, memory systems, hard drives, network interfaces, power supplies, etc. The computer systems or devices may run an operating system including any commercial available server operating system. The computer servers and devices may be connected and communicated through various types of networks, for example, computer networks, telecommunications networks, wireless networks, and any combinations of these an/or other networks.

Order Ring

In certain embodiments of the methods disclosed herein, the orders are expressed as token exchange requests, amountS/amountB, (amount to sell/buy) instead of bids and asks. Since every order is just an exchange rate between two tokens, one feature of the methods disclosed herein is the mixing and matching of multiple orders in circular trade. By using multiple orders instead of a single trading pair, there is a dramatic increase in liquidity and potential for price improvement.

FIG. 1 shows an order-ring of three orders under an exemplary method of the present invention. Referring to FIG. 1, each order's token to sell (tokenS) is another order's token to buy (tokenB). It creates a loop that allows each order to exchange their desired tokens without requiring an opposing order for its pair. Traditional order pair trades can, of course, still be executed, in what is essentially a special case of an order-ring.

As used herein, an "order-ring" can be defined as follows. Let $C_0, C_1, \ldots, C_{n-1}$ be n different kinds of token, $O_{0 \to 1}, \ldots, O_{i \to i\oplus 1}, \ldots, O_{n-1 \to 0}$ be n orders. Those orders can form a order-ring for trading: $O_{0 \to 1} \to \ldots \to O_{i \to i\oplus 1} \to \ldots \to O_{n-1 \to 0}$, where n is the length of the ring, and $i \oplus 1 \equiv i+1 \mod n$.

An order-ring is valid when all component transactions can be executed at an exchange rate equal to or better than the original rate specified implicitly by the user. To verify order-ring validity, the smart contracts of the methods disclosed herein must receive order-rings from ring-miners where the product of the original exchange rates of all orders is equal to or greater than 1.

The following is an example of valid order-ring. Assuming Alice and Bob want to trade their token A and B. Alice has 15 token A and she wants 4 token B for them; Bob has 10 token B and he wants 30 token A for them.

Here, who's the buyer or sell is arbitrary and depends only on the asset fixed to give price quotations. If token A is the reference, then Alice is buying token B for the price of 15/4=3.75 A, while Bob is selling 10 token B for the price of 30/10=3.00 A. In the case of fixing token B as reference, Alice is selling 15 token A for the price of 4/15=0.26666667 B and Bob is buying 10 token A for the price of 10/30=0.33333334 B.

In the first situation Alice is willing to pay a higher price (3.75 A) than the price Bob is selling his tokens for (3.00 A), while in the second situation Bob is willing to pay a higher price (0.33333334 B) than the price Alice is selling her tokens for (0.26666667 B). It is clear that a trade is possible whenever the buyer is willing to pay an equal or higher price than the seller's price.

$$\frac{\frac{15}{4}}{\frac{30}{10}} = \frac{\frac{10}{30}}{\frac{4}{15}} = \frac{15}{4} \cdot \frac{10}{30} = 1.25 > 1$$

Thus, for a set of n orders to be able to be filled, fully or partially, it needs to know if the product of each one of the exchange rates as buy orders results in a number greater or equal to 1. If so, all the n orders can be either partially, or totally filled.

If a third counterparty, Charlie, is introduced, such that Alice wants to give $x_1$ token A and receive $y_1$ token B, Bob wants to give $x_2$ token B and receive $y_2$ token C, and Charlie wants to give $x_3$ token C and receive $y_3$ token A. The necessary tokens are present, and the trade is possible if:

$$\frac{x1 \cdot x_2 \cdot x_3}{y_1 \cdot y_2 \cdot y_3} \geq 1$$

Additional Components of the System

In certain embodiments, the methods and systems of the present invention involve the following components that jointly provide all functionalities a centralized exchange has to offer.

Wallets

In certain embodiments, the methods of the present invention involve a common wallet service or interface that gives users access to their tokens and a way to send orders to the network. Wallets will be incentivized to produce orders by sharing fees with ring-miners.

Consortium Liquidity Sharing Blockchain/Relay-Mesh

In certain embodiments, the methods of the present invention involve a relay-mesh network for order and liquidity sharing. When nodes run a relay software, they are able to join an existing network and share liquidity with other relays over a consortium blockchain. In certain embodiments, the consortium blockchain has near real time order sharing (1-2 second blocks), and trims old history to allow for faster download by new nodes. Notably, relays need not join this consortium; they can act alone and not share liquidity with others, or they can start and manage their own liquidity sharing network.

Relay/Ring-Miners

As used herein, a relay is a node that receives orders from wallets or the relay-mesh, maintains public order books and trade history, and optionally broadcasts orders to other relays (via any arbitrary off-chain medium) and/or relay-mesh nodes. Ring-mining is a feature, but not a requirement, of relays. In certain embodiments, ring-mining is computationally heavy and is done completely off-chain. In certain embodiments, relays with the ring-mining feature are called turned on "Ring-Miners", who produce order-rings by stitching together disparate orders. In certain embodiments, relays are free in (1) how they choose to communicate with one another, (2) how they build their order books, and (3) how they mine order-rings (mining algorithms).

Smart Contracts

In certain embodiments, the methods and systems of the present invention involve a set of public smart contracts that checks order-rings received from ring-miners, trustlessly settles and transfers tokens on behalf of users, incentivizes ring-miners and wallets with fees, and emits events. In certain embodiments, relays/order browsers listen to these events to keep their order books and trade history up to date.

Asset Token Service

In certain embodiments, asset token services serve as a bridge between assets that cannot be directly traded using the methods and systems of the present invention. In certain embodiments, they are centralized services run by trustworthy companies or organizations. Users deposit assets (real, fiat or tokens from other chains) and get tokens issued, which can be redeemed for the deposit in the future.

Exchange Process

Figure 2:
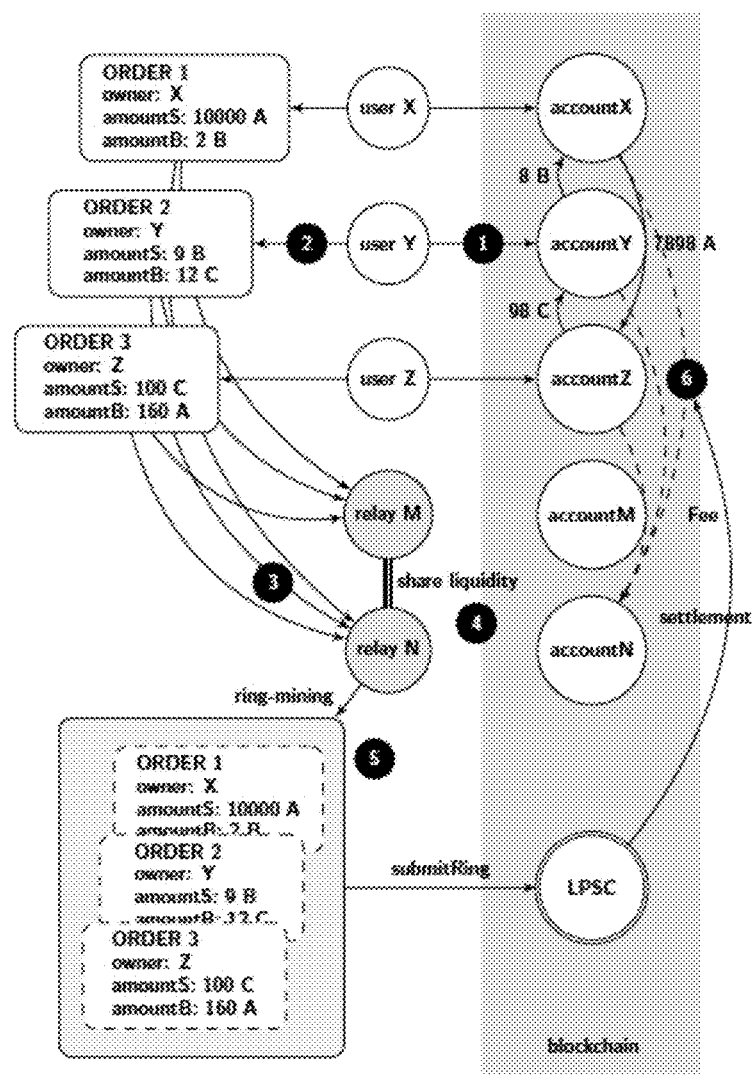
FIG. 2 illustrates the general sequence of steps for exchange process under an exemplary method of the present invention.

The following description refers to FIG. 2, which illustrates an exemplary method of the present disclosure where three orders are matched.

1. Authorization

Referring to FIG. 2, user Y who wants to exchange tokens authorizes a smart contract to handle amountS of token B the user wants to sell. This does not lock the user's tokens, who remains free to move them while the order is processed.

2. Order Creation

Referring to FIG. 2. the current rate and order book for token B vs token C, are provided by relays or other agents hooked up to the network, such as order book browsers. User Y places an order (limit order) specifying amountS and amountB and other parameters through any integrated wallet interface. In certain embodiments, an amount of tokens can be added to the order as a fee for ring-miners; higher fee means a better chance to be processed earlier by ring-miners. The order's hash is signed with user Y's private-key.

3. Order Broadcast

Referring to FIG. 2, the wallet sends the order and its signature to one or more relays. Relays update their public order book. In some embodiments, the methods of the present invention do not require order books to be built in a certain way, such as first-come-first-serve. Instead, relays have the power to make their own design decisions in building their order books.

4. Liquidity Sharing

Referring to FIG. 2, relays broadcast the order to other relays through any arbitrary communication medium. Once again, there is flexibility how/whether nodes interact. To facilitate a certain level of network connectivity, there is a built-in liquidity sharing relay-mesh using a consortium blockchain. As mentioned in the prior section, this relay-mesh is optimized for speed and inclusivity.

5. Ring-Mining (Order Matching)

Referring to FIG. 2, ring-miners try to fill the order fully or partially at the given exchange rate or better by matching it with multiple other orders. In certain embodiments, ring-mining is the main reason why the methods of the present invention are able to provide high liquidity over any pair. If the executed rate is better than what user Y specified, margin is shared amongst all orders in the order-ring. As a reward, the ring-miner chooses between claiming part of the margin (Margin-Split, and giving back the tokens to the user), or simply keeping the fee.

6. Verification and Settlement

Referring to FIG. 2, the order-ring is received by the smart contract, which makes multiple checks to verify the ring-miner supplied data and determines if the order-ring can be settled fully or partially (depending on the fill rate of orders in-ring and tokens in users' wallets). If all checks are successful, the contract automatically transfers the tokens to users and pays the ring-miner and wallet fees at the same time. If user Y's balance as determined by the smart contract is insufficient, it will be considered scaled-down: a scaled-down order will automatically scale up to its original size if sufficient funds are deposited to its address, unlike a cancellation, which is a one-way manual operation and cannot be reversed.

Operational Flexibility

It's important to note that open standard of the methods described herein allows participants significant flexibility in how they operate. Actors are free to implement novel business models and provide value for users, earning fees on volume or other metrics in the process (if they so choose). The system of the present invention is modular and meant to support participation from a multitude of applications.

In certain embodiments, relays can design their order books in any number of ways to display and match users' orders. In some embodiments, limit orders are positioned based on price alone. Timestamps of orders, in other words, have no bearing on the order book. However, a relay is free to design their order book in such a way as to emulate a typical centralized exchange's matching engine, where orders are ranked by price, while respecting timestamps as well. If a relay was inclined to offer this type of order book, they can own/integrate with a wallet, and have those wallet orders sent solely to the single relay, who would then be able to match orders based on time. Any such configuration is possible. Whereas other decentralized exchange methods at times require relays to have resources—initial token balances to place taker orders—in the methods of the present invention, relays need only find matchable orders to consummate a trade and can do so without initial tokens.

In certain embodiments, relays are free to design how they share liquidity (orders) with each other. The consortium blockchain is but one solution to accomplish this, and the system of the present invention is free to network and communicate as they wish. Besides joining a consortium blockchain, they can build and manage their own, creating rules/incentives as they see fit. Relays can also work alone, as seen in the time-sensitive wallet implementation. Of course, there are clear advantages in communicating with other relays in pursuit of network effects, however, different business models could merit peculiar sharing designs and split fees in any number of ways.

Features of the Methods

Order

As used herein, an order is a pack of data that describes the intent of the user's trade. In one embodiment, an order of the present invention is defined as follows:

```
Message Order {
address protocol;
address owner;
address tokenS;
address tokenB;
unit256 amountS;
unit256 amountB;
unit256 IrcFee;
unit256 validSince; //Seconds since epoch
unit256 validUntil; //Seconds since epoch
unit8 marginSplitPercentage; //[1-100]
bool buyNoMoreThanAmountB;
unit256 walletId;
//Dual Authoring address
address authAddr;
//v, r, s are parts of the signature
unit8 v;
byte32 r;
byte32 s;
//Dual-Authoring private-key,
//not used for calculating order's hash,
//thus it is NOT signed.
string authKey;
}
```

To ensure the origin of the order, it is signed against the hash of its parameters, excluding authAddr, with the user's private-key. The authAddr parameter is used for signing order-rings that this order is part of, which prevents front-running. The signature is represented by the v, r, and s fields, and is sent alongside the order parameters over the network. This guarantees the order stays immutable during its whole lifetime. Even though the order never changes, the system of the present invention can still compute its current state based on the balance of its address along with other variables.

The order doesn't include a price (which must be a floating-point number by nature), but, instead uses the term rate or r, which is expressed as amountS/amountB. The rate is not a floating-point number but an expression that will only be evaluated with other unsigned integers on demand, to keep all intermediate results as unsigned integers and increase calculation accuracy.

When a ring-miner ring-matches orders, it's possible that a better rate will be executable, allowing users to get more tokenB than the amountB they specified. However, if buyNoMoreThanAmountB is set to True, the method ensures users receive no more than amountB of tokenB. Thus, the buyNoMoreThantokenB parameter determines when an order is considered completely filled. The buyNoMoreThantokenB parameter applies a cap on either amountS or amountB and allows users to express more granular trade intentions than traditional buy/sell orders.

For example: with amountS=10 and amountB=2, the rate r=10/2=5. Thus the user is willing to sell 5 tokenS for each tokenB. The ring-miner matches and finds the user a rate of 4, allowing the user to receive 2.5 tokenB instead of 2. However, if the user only wants 2 tokenB and set the buyNoMoreThanAmountB flag to True, the smart contract performs the transaction at a rate of 4 and the user sells 4 tokenS for each tokenB, effectively saving 2 tokenS. This does not take into account mining fees.

Indeed, if we use
Order (amountS, tokenS,
   amountB, tokenB,
   buyNoMoreThantokenB)
to represent an order in a simplified form, then for ETH/USD markets on a traditional exchange, traditional buy-sell modeling can express the 1st and the 3rd order below, but not the other two:

1. Sell 10 ETH at price of 300 USD/ETH. This order can be expressed as: Order (10, ETH, 3000, USD, False).
2. Sell ETH at price of 300 USD/ETH to get 3000 USD. This order can expressed as: Order (10, ETH, 3000, USD, True).
3. Buy 10 ETH at price of 300 USD/ETH, This order can be expressed as: Order (3000, USD, 10, ETH, True).
4. Spend 3000 USD to buy as many ETH as possible at price of 300 USD/ETH, This order can be expressed as: Order (3000, USD, 10, ETH, False).

Ring Verification

In certain embodiments of the methods described herein, the smart contracts do not perform exchange rate or amount calculations but must receive and verify what the ring-miners supply for these values. These calculations are done by ring-miners for two main reasons: (1) the programming language for smart contracts, such as solidity on Ethereum, does not have support for floating point math, especially pow (x, 1/n) (calculating the n-th root of a floating-point number), and (2) it is desirable for the computation to be made off-chain to reduce blockchain computation and cost.

1. Sub-Ring Checking

Figure 3:
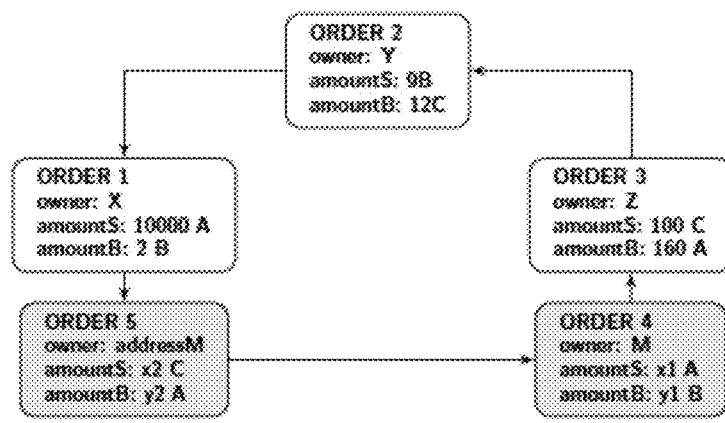
FIG. 3 illustrates an order-ring with sub-ring under an exemplary method of the present invention.

This step prevents arbitrageurs from unfairly realizing all the margin in an order-ring by implementing new orders within it. Essentially, once a valid order-ring is found by a ring-miner, it could be tempting to add other orders to the order-ring to fully absorb the users' margin (rate discounts). As illustrated by FIG. 3, carefully calculated $x_1$, $y_1$, $x_2$ and $y_2$ will make the product of all orders' rate be exactly 1 so there will be no rate discount. This is zero-risk, zero-value add to the network, and is considered unfair conduct by the ring-miner. To prevent this, in certain embodiments, the method of the present invention requires that a valid loop cannot contain any sub-rings. To check this, the smart contract ensures a token cannot be in a buy or sell position twice. Referring to FIG. 3, it can be seen that token A is a sell token twice and a buy token twice, which would be disallowed.

2. Fill Rate Checking

The exchange rate calculations in the order-ring are made by ring-miners for reasons stated previously in the disclosure. It is the smart contract that must verify they're correct. First, it verifies that the buy rate the ring-miner can execute for each order is equal to or less than the original buy rate set by the user. This ensures the user gets at least the exchange rate they asked for or better on the transaction. Once the exchange rates are confirmed, the smart contract ensures that each order in the order-ring shares the same rate discount. For instance, if the discounted rate is γ, then the price for each order will be:

$r_{0 \to 1} \cdot (1-\gamma), r_{1 \to 2} \cdot (1-\gamma), r_{2 \to 0} \cdot (1-\gamma)$, and satisfy:

$r_{0 \to 1} \cdot (1-\gamma), r_{1 \to 2} \cdot (1-\gamma), r_{2 \to 0} \cdot (1-\gamma) = 1$ hence:

$$\gamma = 1 - \frac{1}{\sqrt[3]{r_{0 \to r} \cdot r_{1 \to 2} \cdot r_{2 \to 0}}}.$$

If the transaction crosses n orders, the discount is:

$$\gamma = 1 - \frac{1}{\sqrt[n]{\prod_{i=0}^{n-1} r^i}},$$

where $r^i$ is the order turnover rate of i-th order. Obviously, only when the discount rate is γ≥0, can these orders be filled; and the i-th order ($O^i$)'s actual exchange rate is $$\hat{r}^i = r^i \cdot (1-\gamma), \hat{r}^i \leq r^i.$$

In the prior example where Alice has 15 token A and wants 4 token B for them, Bob has 10 token B and wants 30 token A for them. If token A is the reference, then Alice is buying token B for 15/4=3.75 A, while Bob is selling token B for 30/10=3.00 A. To calculate the discount: 150/120=1.25 thus 1/1.25=0.8=$(1-\gamma)^2$. Thus the exchange rate that renders the trade equitable for both parties is $\sqrt{0.8} \cdot 3.75 \approx 3.3541$ token A per token B.

Bob gives 4 token B and receives 13.4164 token A, more than the 12 he was expecting for those 4 tokens. Alice receives 4 token B as intended but gives only 13.4164 token A in exchange, less than the 15 she was willing to give for those 4 tokens. In certain embodiments, a portion of this margin will go towards paying fees to incentivize miners (and wallets).

3. Fill Tracking and Cancellation

In certain embodiments of the methods described herein, a user can partially or fully cancel an order by sending a special transaction to the smart contract, containing the details about the order and the amounts to cancel. The smart contract takes that into account, stores the amounts to cancel, and emits an OrderCancelled event to the network. The smart contract keeps track of filled and cancelled amounts by storing their values using the order's hash as an identifier. This data is publicly accessible and OrderCancelled/OrderFilled events are emitted when it changes. Tracking these values is critical for the smart contract during the order-ring settlement step. The smart contract also supports cancelling all orders for any trading pair with the OrdersCancelled event and cancelling all orders for an address with the AllOrdersCancelled event.

4. Order Scaling

In certain embodiments, orders can be scaled according to the history of filled and cancelled amounts and the current balance of the senders' accounts. The process finds the order with the smallest amount to be filled according to the above characteristics and uses it as a reference for scaling all transactions in the order-ring.

Finding the lowest value order can help to figure out the fill volume for each order. For instance, if the i-th order is the lowest value order, then the number of tokens sold from each orders ŝ and number of tokens purchased b̂ from each order can be calculated as:

$$\hat{s}^i = \bar{s}_i, \hat{b}^i = \frac{\hat{s}^i}{\hat{r}^i},;$$

$$\hat{s}^{i \oplus 1} = \hat{b}^i, \hat{b}^{i \oplus 1} = \frac{\hat{s}^{i \oplus 1}}{\hat{r}^{i \oplus 1}};$$

$$\hat{s}^{i \oplus 2} = \hat{b}^i, \hat{b}^{i \oplus 2} = \frac{\hat{s}^{i \oplus 2}}{\hat{r}^{i \oplus 2}};$$

. . .

where $\bar{s}_i$ is the balance left after orders are partially filled.

During implementation of the methods described herein, it can be safely assumed that any order in the order-ring to have the lowest value, then iterate through the order-ring at most twice to calculate each order's fill volume. For example, if the smallest amount to be filled compared to the original order is 5%, all the transactions in the order-ring are scaled down to 5%. Once the transactions are completed, the order that was considered to have the smallest amount remaining to be filled should be completely filled.

Ring Settlement

If the order-ring fulfills all the previous checks, the order-ring can be closed, and transactions can be made. This means that all n orders form a closed order-ring, connected as in FIG. 4.

Figure 4:
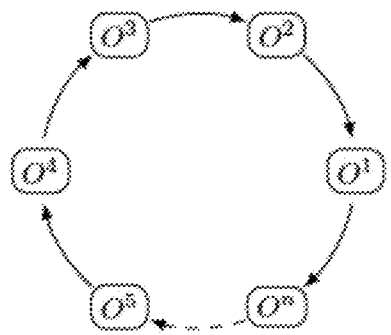
FIG. 4 illustrates a ring settlement under an exemplary method of the present invention.

Referring to FIG. 4, to make the transactions, the method uses the TokenTransferDelegate smart contract. For each order in the order-ring, a payment of tokenS is made to the next or the previous order depending on the implementation. Then the ring-miner's fee is paid depending on the fee model chosen by the ring-miner. Finally, once all the transactions are made, a RingMined event is emitted.

In certain embodiments, the methods described herein include an emitted event selected from the group consisting of OrderCancelled event (a specific order has been cancelled), OrdersCancelled event (all orders of a trading pair from an owning address have been cancelled; AllOrdersCancelled event (all orders of all trading pairs from an owning address have been cancelled), RingMined event (an order-ring has been settled successfully).

Cost and Fees

Figure 5:
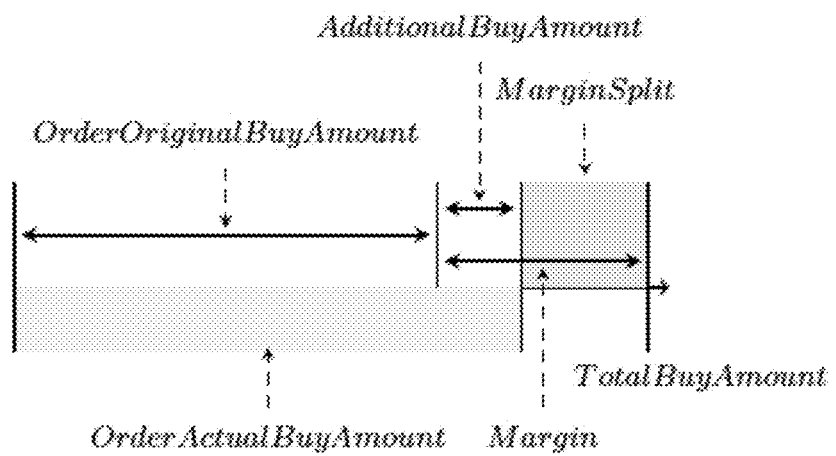
FIG. 5 illustrates a 60% margin split under an exemplary method of the present invention.

In certain embodiments, when a user creates an order, they specify an amount of fees to be paid to the ring-miner, in conjunction with a percentage of the margin (margin-SplitPercentage) made on the order that the ring-miner can claim. This is called the margin split. The decision of which one to choose (fee or margin split) is left to the ring-miner. A representation of the margin split is shown in FIG. 5.

Figure 6:
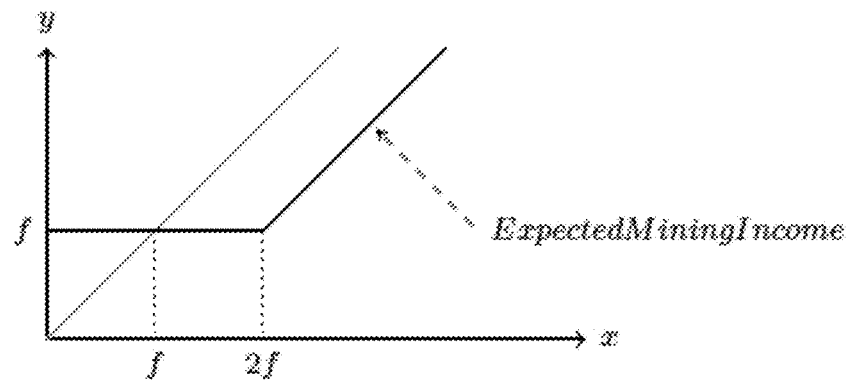
FIG. 6 illustrates a fee model under an exemplary method of the present invention.

If the margin on the order-ring is too small, a ring-miner will choose the fee. If, on the contrary, the margin is substantial enough for the resulting margin split to be worth much more than the fee, a ring-miner will choose the margin split. There is another proviso, however: when the ring-miner chooses the margin split, they must pay the user (order creator) a fee, which is equal to the fee the user would have paid to the ring-miner. This increases the threshold of where the ring-miner will choose the margin split to twice the fee of the order, increasing the propensity of the fee choice. This allows ring-miners to receive a constant income on low margin order-rings for the tradeoff of receiving less income on higher margin order-rings. In certain embodiments, the fee model is based on the expectation that as the market grows and matures, there will be fewer high margin order-rings, thus necessitating fixed fees as incentive. This ends up with the model illustrated in FIG. 6, where f is the fee, x is the margin split, y is the mining income. y=max (f, x−f) as indicated by the solid line; if the fee for the order is 0, the equation is y=max (0, x−0) that simplifies to y=x as indicated by the gray line.

The consequences are:

1. If the margin split is 0, ring-miners will choose the flat fee and are still incentivized.

2. If the fee is 0, the gray line results and the income is based on a general linear model.

3. When the margin split income is greater than 2 times for the fee, ring-miners choose the margin split and pay to the user.

It should be noted that if the fee is non-zero, no matter which option the ring-miner chooses, there will always be a transfer of fee between the ring-miner and the order's sender. Either the ring-miner earns the fee or pays the fee back to the sender to take the margin split.

Ring-miners will share a certain percentage of fees with wallets. When a user places an order through a wallet and gets filled, the wallet is rewarded with a portion of the fees or margin split. Although this is modular, and unique business models or implementations are possible, the inclination is for wallets to receive approximately 20%-25% of earned fees. Wallets represent a primary target for the methods described herein as they have the user base, but little or no source of income.

At its root, the methods and systems described herein is a social protocol in the sense that it relies on coordination amongst members to operate effectively towards a goal. This is not dissimilar to cryptoeconomic protocols at large, and indeed, its usefulness is largely protected by the same mechanisms of coordination problems, grim trigger equilibrium, and bounded rationality. To this end, one designated token can be used to pay fees, thus to align the financial incentives of the various network participants. Such alignment is necessary for broad adoption of any protocol, but is particularly acute for exchange protocols, given that success rests largely on improving liquidity in a robust decentralized ecosystem.

The designated tokens can be used to effectuate protocol updates through decentralized governance. Smart contract updates will, in part, be governed by token holders to ensure continuity and safety, and to attenuate the risks of siphoned liquidity through incompatibility. Given that smart contracts cannot be altered once deployed, there is a risk that dApps or end users continue to interact with deprecated versions and preclude themselves from updated contracts. Upgrade-ability is crucial to the protocol's success as it must adapt to market demands and the underlying blockchains. Decentralized governance by the stakeholders of the designated tokens will allow for protocol smart contract updates without disrupting dApps or end users or relying too heavily on smart contract abstraction. In certain embodiments, the designated tokens have a fixed supply, and in some cases certain percentages are frozen and allocated to community-purposed funds.

However, owners of the designated token are not the only stakeholders to consider in steering the protocol's direction: relays/ringminers, wallets, developers, and others are an integral part of the ecosystem and their voice must be heard. In fact, given that these agents need not hold any designated tokens to perform their respective roles (since traditional makers/takers and market-makers are nonexistent, initial token reserves are not mandatory) alternative methods are allowed for their interests to be respected. Furthermore, "simple" tokenbased voting, both on-chain and off, is an imperfect salve for disagreement, as low voter turnout and token ownership concentration pose risks. Thus, the goal is to implement a governance model that is built in layers, and rests on a shared knowledge that some set of decision-making processes is the norm. This can be facilitated by coordination institutions that offer signals from a diverse set of participants, and, perhaps, from pre-established protocol focal points.

Dual Authoring Process

In decentralized exchanges, front-running is when someone tries to copy another node's trade solution, and have it mined before the original transaction that is in the pending transaction pool (mempool). This can be achieved by specifying a higher transaction fee (gas price). The major scheme of front-running in an order-matching is order-filch: when a front-runner steals one or more orders from a pending order-ring settlement transaction. In certain embodiments, a front-runner may try to steal the entire order-ring from a pending transaction.

When a transaction (submitRing) is not confirmed and is still in the pending transaction pool, anyone can easily spot such a transaction and replace minerAddress with their own address (the filcherAddress), then they can resign the payload with filcherAddress to replace the order-ring's signature. The filcher can set a higher gas price and submit a new transaction hoping block-miners will pick his new transaction into the next block instead of the original transaction.

Previous solutions to this problem had important downsides which requires more transactions and thus costs ringminers more gas and takes at least twice the blocks to settle an order-ring. To solve this problem, in certain embodiments, the method described herein uses a dual authoring process that involves the mechanism of setting up two levels of authorization for orders: one for settlement, and one for ring-mining.

In one embodiment, the dual authoring process includes the following steps:

1. For each order, the wallet software will generate a random public-key/private-key (authKey) pair and put the key pair into the order's JSON snippet. Alternatively, an address (authAddr) derived from the public-key instead of the public-key itself is used to reduce byte size, and authKey is used to represent authAddr's matching private-key.

2. Compute the order's hash with all fields in the order except r, v, s, and authKey, and sign the hash using the owner's private-key (not authKey).

3. The wallet will send the order together with the authKey to relays for ring-mining. Ring-miners will verify that authKey and authAddr are correctly paired and the order's signature is valid with respect to owner address.

4. When an order-ring is identified, the ring-miner will use each order's authKey to sign the ring's hash, minerAddress, and all the mining parameters. If an order-ring contains n orders, there will be n signatures by the n authKeys. These signatures can be called the authSignatures. The ring-miner may also need to sign the ring's hash together with all mining parameters using minerAddress's private-key.

5. The ring-miner calls the submitRing function with all the parameters, as well as all the extra authSignatures. Notably, authKeys are not part of the on-chain transaction and thus remain unknown to parties other than the ring-miner itself.

6. The method will now verify each authSignature against the corresponding authAddr of each order and reject the order-ring if any authSignature is missing or invalid.

The result is that now:

1. The order's signature (by the private-key of the owner address) guarantees the order cannot be modified, including the authAddr.

2. The ring-miner's signature (by the private-key of the minerAddress), if supplied, guarantees nobody can use his identity to mine an order-ring.

3. The authSignatures guarantees the entire order-ring cannot be modified, including minerAddress, and no orders can be stolen.

The dual authorizing process prevents ring-filch and order-filch while still ensuring the settlement of order-rings can be done in one single transaction. In addition, the dual authoring process opens doors for relays to share orders in two ways: nonmatchable sharing and matchable sharing. By default, the method of the present invention operates an OTC model and only supports limit price orders, meaning that orders' timestamps are ignored. This implies that front-running a trade has no impact on the actual price of that trade but does impact whether it gets executed or not.

A person with ordinary skill in the art would understand that certain variants of the Dual Authoring process disclosed herein can be used in the methods described herein.

Partial Dual Authoring

Typically, the Dural Authoring process disclosed above requires the signatures by all the auth_private_keys in a ring. A variant of the Dual Authoring process is to require one or only a few auth_signatures. This Partial Dual Authoring scheme also guarantees a ring as a whole cannot be stolen, but it is subject to order-filch, and the filcher can use stolen orders in another Partial Dual Authoring enabled ring settlement transaction where the stolen orders auth_private_keys are not required at all.

Key-Sharing Dual Authoring

In another variant of the Dual Authoring process, a relay may generate an auth_address/auth_private_key pair and requires all wallets connecting to it to use the same shared auth_address for all the orders (since wallets do not have the auth_private_key, this field is missing from order's JSON payload). This Key-Sharing Dual Authoring scheme allows only that relay to miner the orders, therefore wallets do not have the option of sharing orders with other relays.

It is appreciated that the Summary and Abstract sections may set forth one or more, but not all exemplary embodiments of the present invention as contemplated by the inventor(s), and thus, are not intended to limit the present invention and the appended claims in any way.

Example

This example illustrates the dual authoring process in a digital asset transaction.

Orders of digital assets are created by wallets and tools that can help manage users' private keys. Orders as JSON snippets are transferred to relays as JSON payload over APIs. An example of an order is shown below:

```
{
    "protocol": "0x4c44d51cf0d35172fce9d69e2beac728de980e9d",
    "owner": "0x81C4511396E26Ac12C83c3B178ba0690e863f8D2",
    "token5": "0x2956356cD2a2bf3202F771f50D3D14A367b48070",
    "tokenB": "0xEF68e7C694F40c8202821eDF525dE3782458639f",
    "amount5": "0xa",
    "amountB": "0xc350",
    "timestamp": "0x59ccbe14",
    "ttl": "0xd2f00",
    "salt": "0x1",
    "lrcFee": "0x5",
    "buyNoMoreThanAmountB": true,
    "marginSplitPercentage": 50,
    "v": 28,
    "r": "0xee7b0ffecleae526084a45368c619aa63aaf2fda47d56c09f1768fbbf3753e83",
    "s": "0x28714b81e903ce6b9d484d32be22507aa72e90cb12fc1e2a03f9471afe77a90f"
}
```

The owner field is also known as the order's owner_address from which tokens will be transferred once the order is filled. The order (including the owner_address) must be signed with owner_address's private key. The order is valid only if the order_signature (represented by the r, v, and s) is valid.

Figure 7:
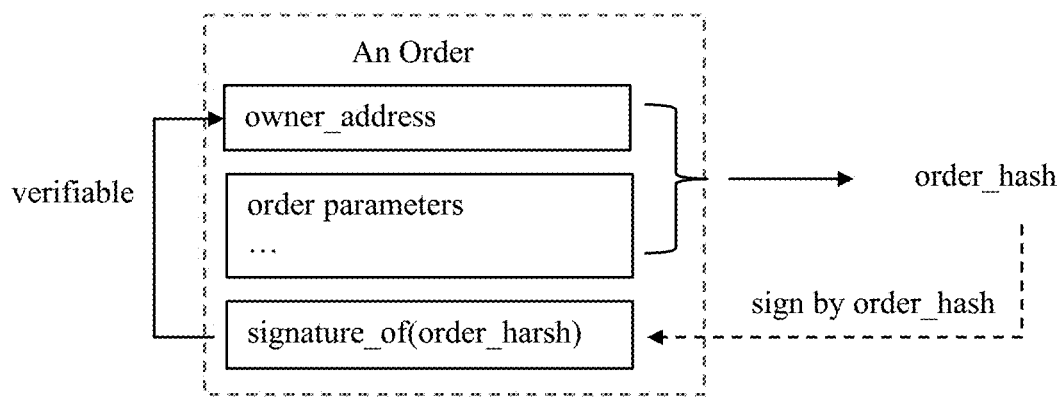
FIG. 7 illustrates a scheme of order signature signed against the order's hash.

As illustrated by FIG. 7, the order_signature is signed against the order's hash (or order_hash), which is the keccak256 function output of all other fields except r, v, and s.

Order_hash is then computed to verify whether the signing address is indeed the owner_address in the order. Relays verifies the signature of each order they receive; the smart-contract also verifies order signatures when 1) orders are submitted as part of a ring and 2) orders are submitted for cancellation.

Figure 8:
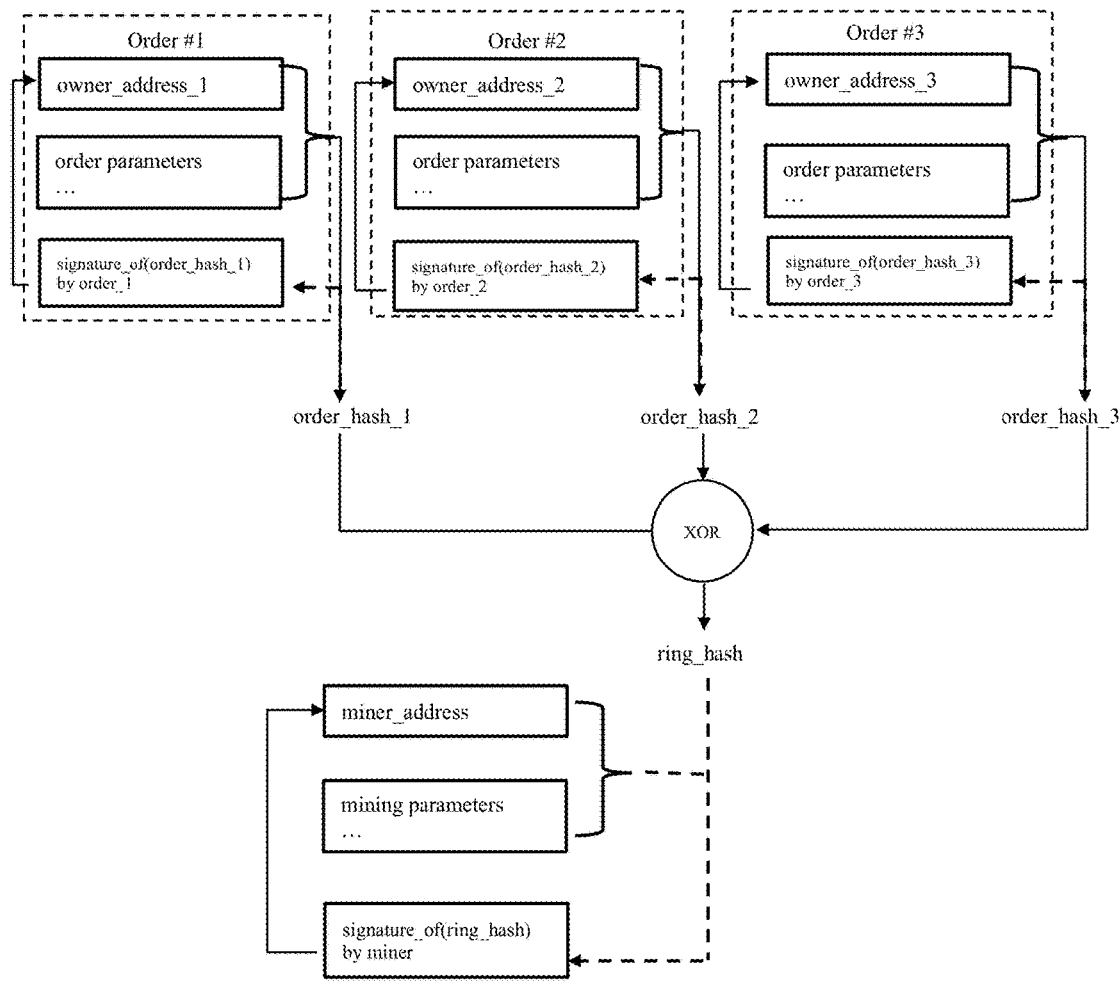
FIG. 8 illustrates a scheme of ring signature signed against all the order hashs.

Rings don't take a JSON form, but are represented by all the parameters of the submitRing function. As illustrated in FIG. 8, a ring encapsulates all the data of its orders (a ring can have 2 to 10 orders). The miner of the ring also populates its address (the miner_address) and other mining parameters (or ring parameters) into the ring so that the submitRing function behaves differently based on these parameters.

Miners need to sign the ring's hash (ring_hash) together with all mining parameters with the private key of the miner_address. The ring_hash is calculated as the XOR op-result of all the order_hashs or using other hash functions.

The method does not require msg.sender to sign anything. In order words, a ring—as the submitRing transaction payload—can be signed by a mining address and the blockchain transaction itself can be signed (and broadcasted) by a different transacting address. The decoupling of mining address and transacting address provides extra flexibility and security advantage.

Figure 9:
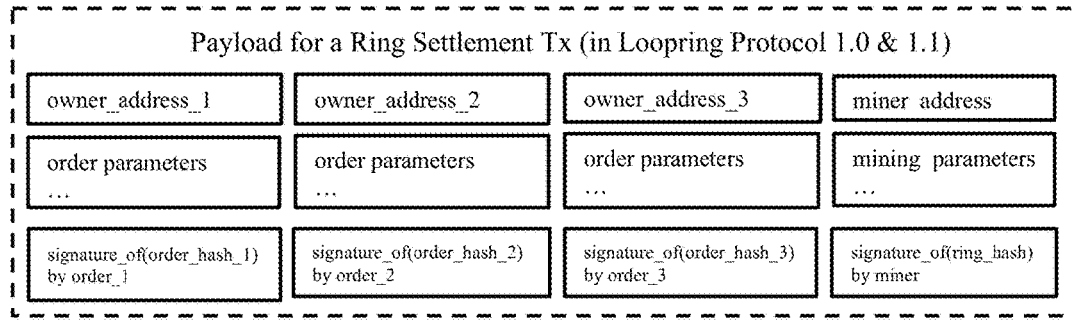
FIG. 9 illustrates the payload of a submitRing transaction for a ring of 3 orders.

FIG. 9 illustrates the payload (or the parameters) of a submitRing transaction for a ring of 3 orders.

Problem of Filch

In order to make sure all trading stats are calculated/updated for the rightful miners, miners are required to sign the rings. These stats are used by members in the consortium liquidity-sharing blockchain to calculate each member's order production and consumption to consolidate inter-consortium payments.

When a submitRing transaction is not confirm and still in the pending transaction pool, anyone can easily spot such a transaction and replace miner_address with his own address (the filcher_address), then he can re-sign the payload with filcher_address to replace the ring's signature. The fincher can set a higher gas price and submit a new transaction hoping block miners will pick his new transaction into the a block instead of the original submitRing transaction.

Figure 10:
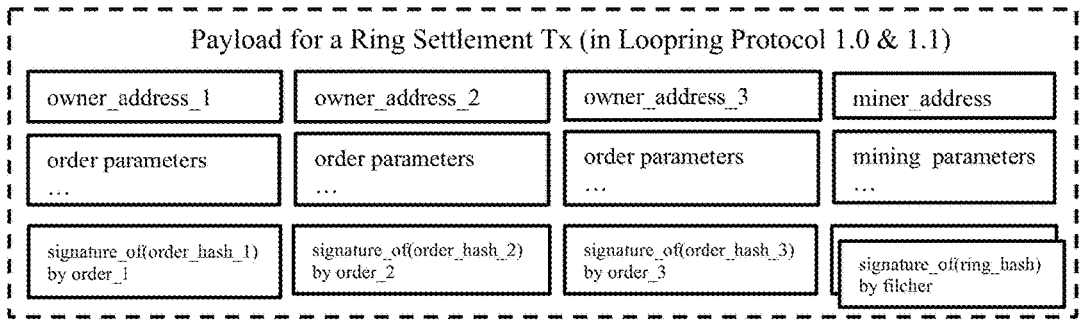
FIG. 10 illustrates the payload filched for a Ring settlement.

In one solution to prevent filch, ring miners are allowed to call either batchSubmitRinghash or submitRinghash function to reserve ring hashes before submitting the actual rings. When a ring is submitted, as shown in FIG. 10, the protocol checks whether the hash of the ring has already been submitted/reserved by other miners, if so, the protocol rejects the ring and the submitRing transaction fails. There are some downsides in this solution: it requires more transactions thus cost miners more gas; and it takes at least twice the block time to settle a ring.

Dual Authoring Method

The solution of this example involves the mechanism of setting up two levels of authorization for orders: one for settlement, and one for mining, which is called dual authoring.

Figure 11:
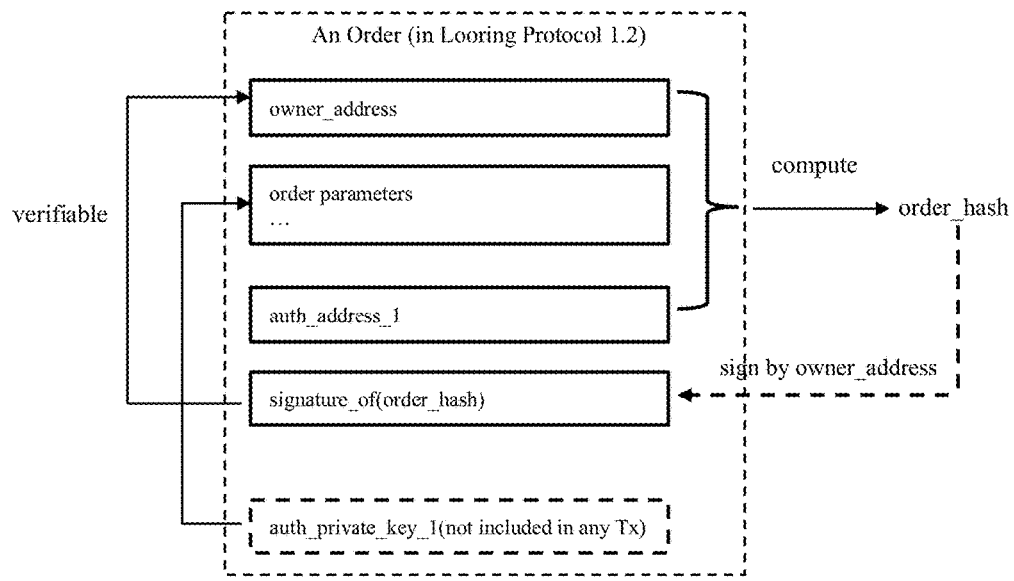
FIG. 11 illustrates an order of dual authorization used in a method of the present invention.
Figure 12:
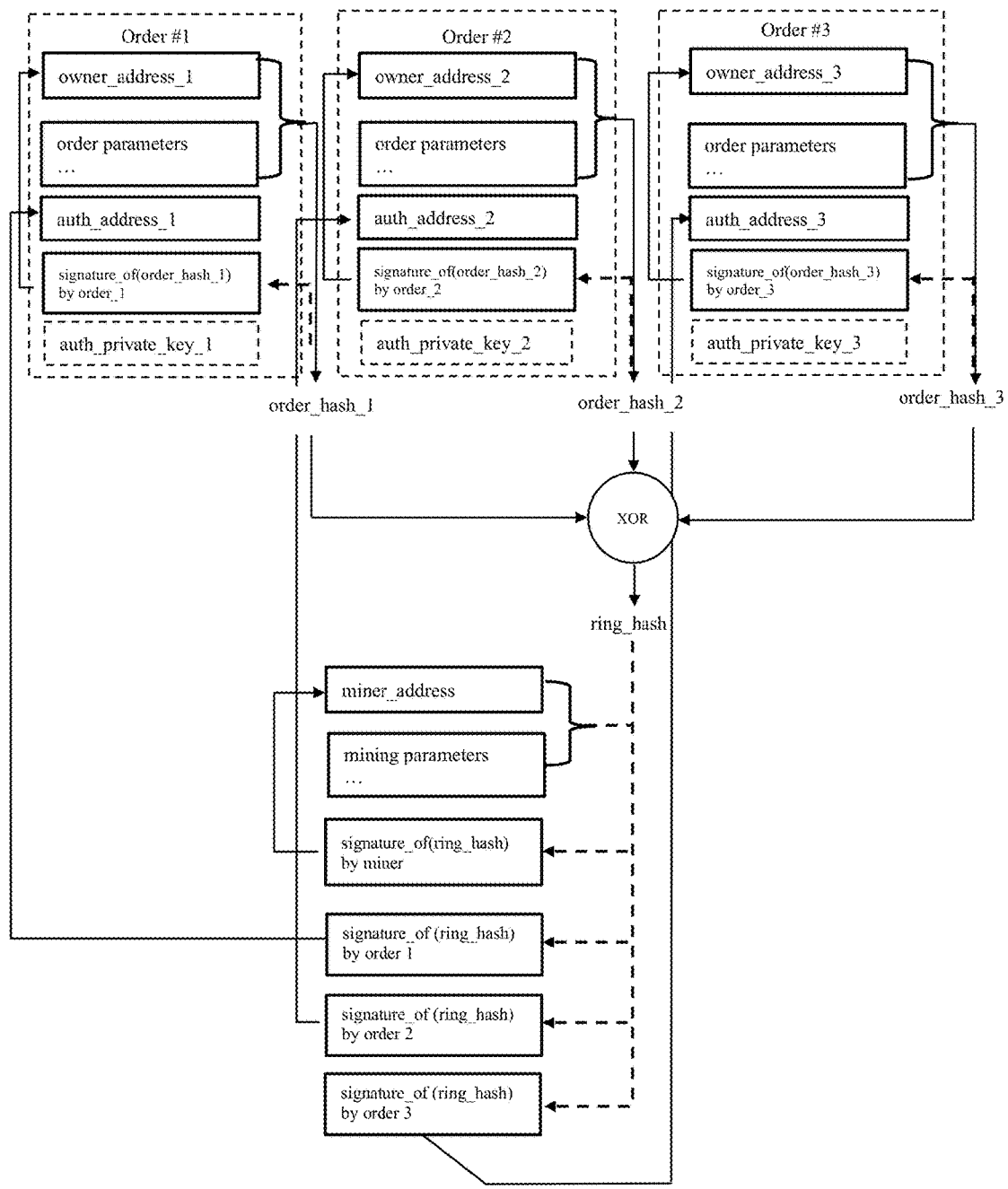
FIG. 12 illustrates an exemplary ring-signing process in a method of the present invention.
Figure 13:
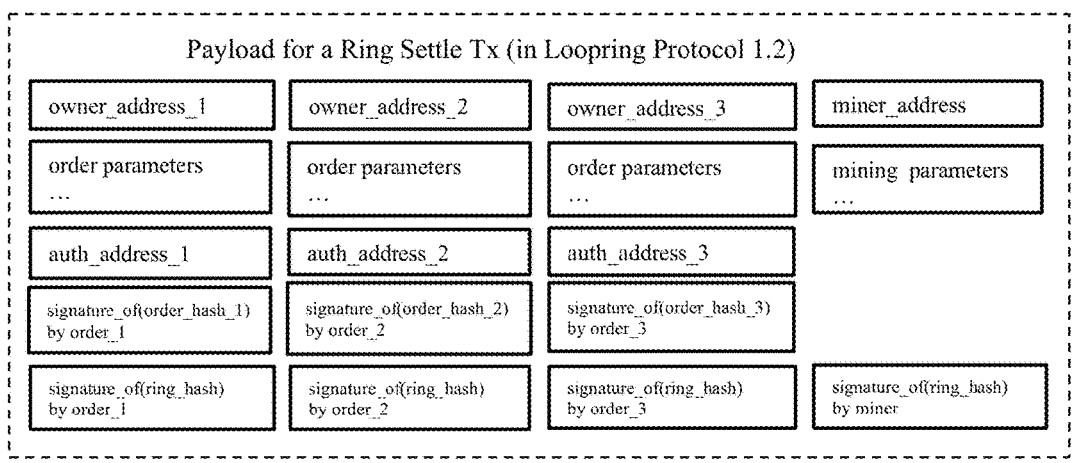
FIG. 13 illustrates a ring seen in an on-chain transaction.

FIGS. 11-13 show an example how the dual authoring process works: For each order, the wallet software generates a random public-key/private-key pair, and put the key pair into the order's JSON snippet. (An alternative is to use the address derived from the public-key instead of the public-key itself to reduce byte size. Auth_address is used to represent such an address, and auth_private_key to represent auth_address's matching private-key).

All fields in the order except auth_private key is signed using the owner_address's private-key (not auth_private_key) as shown in the image below.

The wallet sends the order, together with the auth_private_key to miners (relays) for matching. The miner verifies that auth_private key and auth_address are correctly paired and the order's signature is valid with respect to owner_address.

When a ring is identified, the miner uses each order's auth_private_key to sign what miner_address has to sign, namely ring_hash, miner_address, and all the mining_parameters. As illustrated in FIG. 12, the ring contains 3 orders. Therefore, there are 3 signatures by the 3 auth_private_keys, which are called the auth_signatures. The miner also needs to sign the ring_hash together with all mining parameters using miner_address's private-key.

The miner calls the submitRing function with all the parameters, as well as the 3 extra auth_signatures. Notably, auth_private_keys are not part of the on-chain transaction thus remain unknown to people other than the relay itself, as shown in FIG. 13.

The method verifies that each auth_signature against the corresponding auth_address of each order, and rejects the ring if any auth_signature is invalid.

Now a ring cannot be stolen by anyone unless he has all the auth_private_keys of all enclosed orders. The is because: (1) The order's signature (by the private-key of the owner_address) guarantees the order cannot be modified, including the auth_address; (2) The miner's signature (by the private-key of the miner_address) guarantees nobody can use his identity to mine a ring; (3) The auth_signatures guarantees the entire ring cannot be modified, including miner_address; and (4) since ring-filchers do not have access to auth_private_keys, they cannot re-generate a new set of auth_signatures thus are unable to generate a filch transaction.

What is claimed is:

1. A method for settling digital asset trade on a distributed ledger, the method comprising executing on a server the steps of:
    receiving n orders of digital asset from n order-owners respectively, wherein n is an integer of at least 2, and wherein the ith order (1≤i≤n) is received from the ith order-owner and comprises
        an ith order-owner's address on the distributed ledger,
        an ith order-owner's digital signature,
        an ith order's authoring public key, and
        an ith order's authoring private key;
    verifying that each of the n order-owners' digital signatures is valid;
    generating a transaction comprising
        each of the n order-owners' addresses,
        each of the n order-owners' digital signatures, and
        each of the n orders' authoring public keys;
    generating n authoring digital signatures of the transaction using each of the n authoring private keys respectively; and
    broadcasting the transaction and the n authoring digital signatures on a distributed ledger network.

2. The method of claim 1, wherein at least one of the digital assets is a cryptocurrency.

3. The method of claim 1, wherein the distributed ledger is Bitcoin, Ethereum, Bitcoin Cash, Cardano, Stellar, NEO, Qtum, EOS, IOTA, Monero or BitShares.

4. The method of claim 1, wherein the distributed ledger network, after receiving the transaction, determines that each of the n order-owners' addresses is not overspending.

5. The method of claim 4, wherein the distributed ledger network, after determining that each of the n order-owners' addresses is not overspending, completes the transaction according to the n orders.

6. The method of claim 1, wherein the transaction does not include any of the n authoring private keys.

7. The method of claim 1, wherein the transaction further comprises a server's digital signature generated by using a server's private key.

8. A non-transitory readable storage medium including instructions, executable by a processor in a server, for settling digital asset trade on a distributed ledger, the instructions when executed by the processor, performing the steps comprising:
  receiving n orders of digital asset from n order-owners respectively, wherein n is an integer of at least 2, and wherein the ith order (1≤i≤n) is received from the ith order-owner and comprises
    an ith order-owner's address on the distributed ledger,
    an ith order's digital signature,
    an ith order's authoring public key, and
    an ith order's authoring private key;
  verifying that each of the n order-owners' digital signatures is valid;
  generating a transaction comprising
    each of the n order-owners' addresses,
    each of the n order-owners' digital signatures, and
    each of the n orders' authoring public keys;
  generating n authoring digital signatures of the transaction using each of the n authoring private keys respectively; and
  broadcasting the transaction and the n authoring digital signatures on a distributed ledger network.

9. The non-transitory readable storage medium of claim 8, wherein at least one of the digital assets is a cryptocurrency.

10. The non-transitory readable storage medium of claim 9, wherein the distributed ledger is Bitcoin, Ethereum, Bitcoin Cash, Cardano, Stellar, NEO, Qtum, EOS, IOTA, Monero or BitShares.

11. The non-transitory readable storage medium of claim 8, wherein the distributed ledger network, after receiving the transaction, determines that each of the n order-owners' addresses is not overspending.

12. The non-transitory readable storage medium of claim 11, wherein the distributed ledger network, after determining that each of the n order-owners' addresses is not overspending, completes the transaction according to the n orders.

13. The non-transitory readable storage medium of claim 8, wherein the transaction does not include any of the n authoring private keys.

14. The non-transitory readable storage medium of claim 8, wherein the transaction further comprises a server's digital signature generated by using a server's private key.

15. A system for settling digital assets trade on a distributed ledger, the system comprising:
  a distributed ledger comprising at least n addresses, wherein n is an integer of at least 2;
  a server which
    receives n orders of digital asset from order-owners respectively, wherein the ith order (1≤i≤n) is received from the ith order-owner and comprises
      an ith order-owner's address on the distributed ledger,
      an ith order-owner's digital signature,
      an ith order's authoring public key, and
      an ith order's authoring private key;
    verifies that each of the n order-owners' digital signatures is valid;
    generates a transaction comprising
      each of the n order-owners' addresses,
      each of the n order-owners' digital signatures, and
      each of the n orders' authoring public keys,
    generates n authoring digital signatures of the transaction using each of the n authoring private keys respectively; and
    broadcasts the transaction and the n authoring digital signatures on a distributed ledger network; and
  a settler which completes the transaction on the distributed ledger network.

16. The system of claim 15, wherein at least one of the digital assets is a cryptocurrency.

17. The system of claim 16, wherein the distributed ledger is Bitcoin, Ethereum, Bitcoin Cash, Cardano, Stellar, NEO, Qtum, EOS, IOTA, Monero or BitShares.

18. The system of claim 15, wherein the distributed ledger network, after receiving the transaction, determines that each of the n order-owners' addresses is not overspending.

19. The system of claim 15, wherein the transaction does not include any of the n authoring private keys.

20. The system of claim 15, wherein the transaction further comprises a server's digital signature generated by using a server's private key.

* * * * *